United States Patent [19]
Siefert et al.

[11] 3,792,985
[45] Feb. 19, 1974

[54] METHOD OF MAKING GLASS-METAL FIBER COMPOSITES

[75] Inventors: August G. Siefert, Granville; Fred T. Sens, Newark, both of Ohio

[73] Assignee: Owens-Corning Fiberglas Corporation, Toledo, Ohio

[22] Filed: Aug. 19, 1971

[21] Appl. No.: 173,265

Related U.S. Application Data

[63] Continuation of Ser. No. 860,417, Sept. 23, 1969, abandoned.

[52] U.S. Cl.............................. 65/13, 29/419, 65/3, 117/54, 117/128, 117/129
[51] Int. Cl............................................. C03b 37/02
[58] Field of Search........ 65/2, 3, 4, 13, 60, DIG. 7; 117/53, 128, 129, 54; 106/50, 52; 161/175; 29/419

[56] References Cited
UNITED STATES PATENTS

| 3,241,934 | 3/1966 | Granitsas et al.................... | 65/60 X |
| 3,451,847 | 6/1969 | Ashpole et al................. | 117/129 X |
| 3,473,999 | 10/1969 | Muchow.............................. | 106/52 |
| 3,491,055 | 1/1970 | Talley.................................. | 106/52 |

Primary Examiner—Robert I. Lindsay, Jr.
Attorney, Agent, or Firm—Carl G. Staelin; John W. Overman; W. Preston Hickey

[57] ABSTRACT

Composites of glass reinforced by metal fibers are made by fusing glass coated metal fibers together. The coated fibers may be made by drawing a fiber through a tube of the glass and softening a narrow band of the glass tube around the fiber as the fiber is pulled from the tube. Glass-metal fibers so produced are arranged next to one another, and the glass is fused together at a temperature above the annealing point of the glass and approximately at the softening point of the glass. In the case of boron fibers, the fibers are kept at a temperature desirably below 1,650°F. as the composite is being prepared. The composites of the invention include boron, tungsten, or molybdenum fibers in glass. Procedures given can also produce composites with stainless steel, or carbon steel fibers.

7 Claims, No Drawings

METHOD OF MAKING GLASS-METAL FIBER COMPOSITES

The present application is a continuation of copending application Ser. No. 860,417, filed Sept. 23, 1969, and which is now abandoned.

BACKGROUND OF THE INVENTION

Metal fibers such as boron, tungsten, molybdenum or steel are oxidized at high temperatures. In order for these fibers to be useful at these high temperatures, they must be encased or in some manner protected so that the fibers do not oxidize. One way to encase the fibers is to combine them with a matrix material, such as a resin, to make reinforced resin products. In such products, the high modulus of the reinforcing fibers as compared to the modulus of the matrix resin assures that the reinforcing fiber carries the load imposed on the composite. High modulus fibers used in such composites increase the modulus of the composite. Although such fiber reinforced resin or other organic material products are well known and have been used in the past, the limiting factor with respect to use is sometimes inadequate resistance to elevated temperatures. A better matrix material from high temperature resistant considerations is a material such as a glass or a ceramic material. Glass is stronger and stiffer and much more resistant to elevated temperatures than organic materials. Oxidation of metal fibers, such as those listed above, at temperatures at which glass melts has been a major obstacle to the use of glass as a matrix material. There has been only one noteworthy prior attempt to produce boron fiber reinforced glass composite (Air Force Material Laboratory Report ML-T-DR-64-88), and in this attempt the fiber strength in the composite produced was only about 50 percent of the strengths that have been provided by composites produced in accordance with the teachings of the present invention. The present composites have greater strength even though prior attempts to produce the composites utilized up to twice as much reinforcing fiber. Thus, the effective strengths of the reinforcements made in accordance with the present invention are from two to four times that of the reinforcements made in accordance with prior attempts.

The composite referred to in the Air Force report had very poor corrosion resistance, was attacked badly by water because the process used required a glass composition which was very fluid at temperatures of about 1,600°F.; and, therefore, had poor corrosion resistance. The glass also had poor resistance to attack since it is soluble in water.

An object of the present invention is the provision of a new and improved process of producing composites of glass reinforced by high temperature resistant metal fibers, wherein the metal fibers retain a large part of their strength, and the composites have reduced sensitivity to surface scratches or notches.

A new method of incorporating refractory metal fibers in a glass matrix has been provided, which method prevents undue oxidation and deterioration of the refractory metal fibers and produces composites having unusually high strength, impact resistance, and modulus of elasticity. In order to achieve these properties, it is desirable that the glass wets the surfaces of the fibers to provide an integral structure. It is believed that oxides on the surface of refractory metals, such as boron, aid in bonding the fibers to a glass matrix. Some oxidation appears to be beneficial, however, materials such as boron, if in the fiber form, can be deleteriously affected by high temperatures if they are subjected to those temperatures for sufficient time. Destruction of the fibers or partial deterioration is, of course, not desirable. In making boron fiber reinforced glass composites, boron oxide from the surface of the fiber is dissolved by the glass matrix forming material, to form a borosilicate interface that becomes integral with both the matrix and the fiber.

High strength, high temperature-resistant composites that are impact resistant, notch insensitive, and do not fail catastrophically are made by combining a fiber reinforcement with a matrix wherein the fiber and matrix have the following requisite relationships: (1) the fiber tensile strength is greater than the tensile strength of the matrix, (2) the fiber modulus of elasticity is greater than the modulus of the matrix, and (3) the coefficient of expansion of the matrix is less than the coefficient of expansion of the fibers. When these relationships exist, the composite is strong since the reinforcement bears a large proportion of the load imposed upon the composite. The matrix is placed under compression, which makes it possible to use a high temperature resistant glass or ceramic material as the matrix material. Glass is strong in compression even though not strong in tension and, of course, has the required exceptional heat and oxidation resistance.

In accordance with the invention, glass is combined with refractory metal fibers at as low a temperature as feasible and the fibers are subjected to this temperature for as short a period of time as possible. One way to accomplish this is by pulling the fibers through a glass tube of the desired glass composition and melting a narrow band of the glass tube, by externally generated heat, to produce a flow of the glass onto the fiber. The fiber and glass coating are promptly cooled in air to produce the sheathed refractory metal fibers. The sheathing does not crack because it is held under compression during and after cooling. These glass-sheathed refractory metal fibers are then gathered together and the envelopes are fused together at as low a temperature as possible and preferably at a temperature close to the softening point of the glass composition. The fiber reinforcements should have a coefficient of expansion greater than that of the matrix so that upon cooling, the glass is placed in compression. Glasses are strong in compression. Some glasses which are suitable for the matrix material herein will devitrify to form a composite having unusual properties. These latter provide fiber-reinforced glass-ceramic materials.

DESCRIPTION OF A PREFERRED EMBODIMENT

Example 1

Boron monofilament about 0.004 inch in diameter is made by vapor deposition of boron upon a tungsten filament which is approximately 0.001 inch in diameter. The boron monofilament is uncoiled from a spool and passed downwardly through a glass tube having an outside diameter of about 6mm. and an inside diameter of about 4mm. The glass, which is known as "Pyrex" 7740, has a coefficient of expansion of $33 \times 10^{-7}/°C.$, a Youngs Modulus of $9.1 \times 10^6$ pounds per square inch, and the following typical composition in parts by weight:

| | |
|---|---|
| $SiO_2$ | 80.5 |
| $B_2O_3$ | 12.9 |
| $Na_2O$ | 3.0 |
| $Al_2O_3$ | 2.2 |
| $K_2O$ | 0.4 |

An oxygen - hydrogen, or oxygen-acetylene burner, in the shape of a ring and having jet openings of 0.001 inch, is used to produce flames, the blue tip portions of which impinge upon the glass tube to soften the lower end of the tube about the fiber. The glass is pulled downwardly through the burner at such a rate that the tube is softened as it presents itself, and the fiber is pulled downwardly at a higher rate so that the glass "necks down" and forms about the fiber. The lower one-eighth inch length of the tube is softened sufficiently to flow around the fiber, and the coated fiber is promptly air quenched upon leaving the burner. The glass coating on the boron fiber is approximately 0.0002 inch thick. The exact rates of advancement are possibly not critical, but it is important not to heat the fibers to higher temperatures than necessary to accomplish the desired softening and necking down of the glass above the fiber.

A composite is made of the sheathed fibers above by packing a glass tube of the same composition used for sheathing the coated fibers. As an alternative, the glass tube may be a different composition than the glass used for sheathing the fibers, but having a comparable viscosity at the temperature at which the composite is formed. One end of the tube is fused together and the other end of the tube is connected to a partial vacuum. The portion of the tube which contains the fibers is placed in a resistance furnace maintained at from 1,500°–1,600°F. while vacuum is communicated with the tube (this provides about 15 psi pressure on the tube and the fibers). The glass tube is fused around the coated fibers. Immediately after fusing, the composite is removed from the furnace and is air cooled. Composites so made, having a boron fiber loading of 30 percent by volume, have a flexural strength of about 160,000 pounds per square inch.

Test bars that are one-fourth inch in diameter and notched to a depth of about one thirty-second inch, retain most of their flexural strength (160,000 psi down to about 115,000 psi). Although the flexural strength dropped to 115,000 psi from 160,000 psi, this is an unusual retention of flexural strength after notching a rod. In contrast, the strength of unreinforced glass rods or ceramics, drops drastically when similarly notched. The modulus of such composites is about $23 \times 10^6$ psi. These composites retain their properties when immersed in water. For example, a rod containing 40 percent by volume boron fibers, was loaded to 50 percent of its ultimate flexural strength and held in this loaded condition under water for 5.7 days. The rod was removed and this flexural strength did not differ significantly from the original, unwetted material. Similar results were achieved when the specimens were notched. The compressive strength of these composites is very high, being about 300,000 psi. These composites retain their properties at high temperatures. For example, the flexural strength and modulus of specimens exposed at 1,000°F. for 100 hours was comparable to that of the original specimens when the properties were measured at room temperature. When the properties were measured at 1,000°F., the flexural strength dropped only slightly to about 140,000 psi and the flexural modulus also dropped only slightly to about $17 \times 10^6$ psi. The composites when boiled for 2 hours in water showed no decrease in strength. Composites, when cycled between liquid nitrogen and room temperature for six times, had a flexural strength of 167,000 pounds per square inch. Samples, when notched and subjected to an impact test, were found to have substantially no decrease in strength over unnotched samples. This is surprising for materials containing a large proportion of glass.

Example 2

The sheathing process of Example 1 was repeated using a glass known as RZ-2 (Owens-Illinois Inc.) which has a coefficient of thermal expansion of $5 \times 10^{-7}$/°C. and the following composition:

12.5 mol percent CuO
12.5 mol percent $Al_2O_3$
75.0 mol percent $SiO_2$

The fibers produced can be combined with a matrix of the above composition to form a composite having the desirable properties of Example 1. This composition is based on the $Cu_2O$—$Al_2O_3$—$SiO_2$ system and is very useful in making a composite because it has a relatively low melting and softening temperature, while retaining the low thermal expansion of high melting, fluid glasses of high silica content.

Example 3

The process of Example 1 was repeated using a glass tube having a coefficient of thermal expansion ranging from 7 to $20 \times 10^{-7}$/°C. depending on the heat treatment, and the following typical weight composition:

| | |
|---|---|
| $SiO_2$ | 70.7 |
| $Na_2O$ | 0.2 |
| $Al_2O_3$ | 17.8 |
| XnO | 1.4 |
| $TiO_2$ | 4.2 |
| MgO | 3.2 |
| $Li_2O$ | 2.4 |

This glass is known as Corning 9608. This titania-alumina-silicate glass composition devitrifies. Composites formed using this glass as a matrix provide a boron fiber reinforced ceramic like material.

Example 4

The process of Example 1 is repeated excepting that type 304 stainless steel fibers were used in place of the boron monofilaments. This material does not have the extremely high temperature characteristics of the boron, tungsten, or molybdenum composites of the present invention, but it has desirable high strength and impact resistant properties at temperatures which are higher than those which fiber reinforced resins can withstand, and it is lower in cost.

Example 5

The process of Example 4 is repeated excepting that carbon steel rocket wire is used in place of the stainless steel monofilament. This material, although it does not have the high strength properties at elevated temperatures of the materials of Examples 1–3, has high strength properties at temperatures which are higher than those which fiber reinforced resins can withstand.

Rods, sheets, plates and cylinders can be fabricated utilizing the concepts of this invention. Process variables include temperature, pressure and time. Glass may be regarded as a high-temperature, inorganic, thermoplastic. It has the desirable characteristic of undergoing a relatively slow rate of change of viscosity with a change of temperature. As the temperature is increased, glass resembles a syrup which becomes increasingly fluid. In contrast, metals become extremely fluid and almost watery above their melting points. The processing behavior and product quality of composites having glass matrices is subject to reliable control by employing adequate temperature control systems. In cases where reactions between the fiber and the matrix may be deleterious, these harmful effects can be minimized by forming the composites at temperatures which are as low as practical. Inert gases or evacuated systems may be used to minimize the effects of oxidation and corrosion of the metal fibers before they become encased in glass. After they are encased in glass, deleterious effects are minimized. Only low pressures of from 15-100 psi are required to form filaments (prepregged with glass) into composites. The time required to mold an article is controlled by such factors as the fluidity of the matrix glass, the rate of heat transfer, the size of the piece, and the pressure applied. The article is cooled in the mold until it is sufficiently rigid to be removed. The article is then transferred to an off-line operation for heat treatment, i.e., annealing or devitrification to develop glass-ceramic articles.

In order to produce undevitrified composites of the present invention having high strength properties at temperatures above 1,000°F, the undevitrified glass should have the following composition:

| Material | Percent By Weight |
|---|---|
| $SiO_2$ | 65-100 |
| Group I Oxides | 0-20 |
| CaO | 0-5 |
| MgO | 0-10 |
| Group III Oxides | 0-25 |
| Group IV & VI Oxides other than $SiO_2$ | 0-20 |

It will be seen that the glass of the above examples are all within the composition range given above. All of the reasons why the glass must have this composition in order to achieve the high strength at elevated temperatures is not known, but it is believed that oxides of the metal fibers may modify the matrix glass, when the matrix glass is fused about the fibers, to produce a thin glass phase having a different coefficient of expansion, than either the fibers or the glass matrix. Oxidation of the metal fibers, therefore, must be kept low, Group I fluxing oxides must also be kept low, and the Group IV and Group VI oxides must be kept below 20 percent in order that they will not undergo a reduction by the metal fibers to produce an undersirable intermediate phase. The above definition will include fused quartz, "Vycor," and other high silica glasses having less than 5 percent of other additives; it will include the boro-silicate glasses in which $B_2O_3$ is the primary additive, and of which the glass given in Example 1 is typical. When the glasses used to form the matrix of the composite are to be devitrified, they should have the following composition in percent by weight: from 40% to 80% of $SiO_2$ (preferably 65% to 75%); from 10% to 35% of $Al_2O_3$ or $B_2O_3$ (preferably 15% to 25%); from 2% to 25% of a nucleating agent from the group consisting of $TiO_2$, $ZnO_2$, $V_2O_5$, CoO, NiO, $MoO_3$, $Fe_2O_3$, or $ThO_2$ (preferably 3% to 10%); from 2% to 30% of a basic oxide from the group consisting of $LiO_2$, BeO, MgO, CaO, ZnO, SrO, CdO, BaO, PbO, MnO, and FeO (preferably 2.5% to 15%); and less than 3% of $Na_2O$ and $K_2O$ (preferably 0.1% to 2.0%).

Desirably the heat used to fuse the glass to the fibers should pass through the glass, and no more than approximately one-half inch of molten glass should contact the bare fibers in order that the glass will be tacked or bonded to the metal fibers without producing further oxidation of the fibers, or without heating the metal of the fibers to an extent causing the metal to go through a phase change. Boron, for example, undergoes a harmful phase change at approximately 1,650°F. Desirably thereafter, the glass coatings are fused together at a temperature near the softening point, using pressure to forge the glass coatings together.

Although specific embodiments of the invention have been disclosed, the invention is not to be limited thereto, but rather obvious modifications and variations may be made within the spirit of the scope of the appended claims.

We claim:

1. The process of producing boron fiber reinforced refractory composites comprising: pulling an otherwise unheated boron fiber through a narrow band of softened glass the exterior of which is heated by a narrow band of flame which causes the softened glass to flow onto the fiber moving therethrough, said glass having a coefficient of expansion of less than approximately $33 \times 10^{-7}$ per degree Centigrade and the following composition in percent by weight:

| | |
|---|---|
| $SiO_2$ | 65-100 |
| Group I oxides | 0-20 |
| CaO | 0-5 |
| MgO | 0-10 |
| Group III oxides | 0-25 |
| Group IV and VI oxides other than $SiO_2$ | 0-20 | air quenching the glass on the fiber immediately after the glass coated fiber leaves the flame, and forging a plurality of the glass coated fibers together at a temperature below 1,650°F.

2. The process of producing boron fiber reinforced refractory composites comprising: pulling an otherwise unheated boron fiber through a glass tube that is softened by the impingement of a narrow band of gas flame on the outside of the tube to cause a thin sheet of glass to flow onto the fiber moving therethrough, said glass having a coefficient of expansion of less than approximately $33 \times 10^{-7}$ per degree Centigrade and the following composition in percent by weight:

| | |
|---|---|
| $SiO_2$ | 65-100 |
| Group I oxides | 0-20 |
| CaO | 0-5 |
| MgO | 0-10 |
| Group III oxides | 0-25 |
| Group IV and VI oxides other than $SiO_2$ | 0-20 | air quenching the glass on the fiber immediately after the glass coated fiber leaves the flame, and forging a plurality of the glass coated fibers together at a temperature below 1,650°F.

3. The method of claim 2 wherein the glass has approximately the following composition in mol percentages: 75.0 $SiO_2$, 12.5 $Cu_2O$, and 12.5 $Al_2O_3$.

4. The method of claim 2 wherein the glass is a devitrifiable alumina-titania-silicate glass.

5. The method of claim 2 wherein the glass has approximately the following weight composition: $SiO_2$, 70.7; $Na_2O$, 0.2; $Al_2O_3$, 17.8; ZnO, 1.4; $TiO_2$, 4.18; MgO, 3.15; and $Li_2O$, 2.38.

6. The method of claim 1 wherein the glass has the following composition in approximate percentages by weight: from 40% to 80% of $SiO_2$, from 10% to 35% of $Al_2O_3$ and/or $B_2O_3$, from 2% to 20% of a nucleating agent from the group consisting of $TiO_2$, $ZrO_2$, $V_2O_5$, CoO, NiO, $MoO_3$, $Fe_2O_3$ and $ThO_2$; from 2% to 30% of a basic oxide from the group consisting of $Li_2O$, BeO, MgO, CaO, ZnO, SrO, CdO, BaO, PbO, MnO, FeO; and less than 3% of $Na_2O$ and $K_2O$.

7. The boron fiber reinforced glass composite produced by the method of claim 1.

* * * * *